United States Patent [19]

Kuno et al.

[11] Patent Number: 5,528,491

[45] Date of Patent: Jun. 18, 1996

[54] APPARATUS AND METHOD FOR AUTOMATED NATURAL LANGUAGE TRANSLATION

[75] Inventors: Susumu Kuno, Belmont; Barton D. Wright, Auburndale, both of Mass.

[73] Assignee: Language Engineering Corporation, Belmont, Mass.

[21] Appl. No.: 938,413

[22] Filed: Aug. 31, 1992

[51] Int. Cl.⁶ .................................................. G06F 17/28
[52] U.S. Cl. .................. 364/419.08; 364/419.02; 364/419.05
[58] Field of Search ............... 369/419.02, 419.03, 369/419.05, 419.08

[56] References Cited

U.S. PATENT DOCUMENTS

| | | | |
|---|---|---|---|
| 4,791,587 | 12/1988 | Doi | 364/DIG. 2 |
| 4,833,611 | 5/1989 | Fukumochi et al. | 364/419 |
| 4,916,614 | 4/1990 | Kaji | 364/419 |
| 4,984,178 | 1/1991 | Hemphill et al. | 364/419 X |
| 5,029,085 | 7/1991 | Ito | 364/419 |
| 5,060,155 | 10/1991 | van Zuijlen | 364/419 |
| 5,136,503 | 8/1992 | Takagi et al. | 364/419 |
| 5,214,583 | 5/1993 | Miiko et al. | 364/419 |
| 5,243,520 | 9/1993 | Jacobs et al. | 364/419.08 |
| 5,321,607 | 6/1994 | Fukumochi et al. | 364/419.04 |

OTHER PUBLICATIONS

Stanley Y. W. Su, "Heuristic Algorithms for Path Determinations in a Semantic Network", IEEE Cat. No. 0730-3157/90/0000/0587, 1990, pp. 587-592.

*Primary Examiner*—Gail O. Hayes
*Assistant Examiner*—Frantzy Poinvil
*Attorney, Agent, or Firm*—Testa, Hurwitz & Thibeault

[57] ABSTRACT

Method and apparatus for automated natural language translation. Source language textual statements are stored in computer memory, and interpretations of source language textual statements are stored in a graph. An editing interface allows for the display of altered translations based on user input, and translation operations include semantic propagation based on stored grammar rules.

5 Claims, 9 Drawing Sheets

1

APPARATUS AND METHOD FOR AUTOMATED NATURAL LANGUAGE TRANSLATION

BACKGROUND OF THE INVENTION

The invention relates to the automated translation of natural languages, and in particular to translation between English and Japanese.

Researchers have proposed various schemes for the machine-based translation of natural language. Typically, the apparatus used for translation includes a computer, which receives input in one language, and performs operations on the received input to supply output in another language. This type of translation has been an inexact one, and the resulting output usually requires editing by a skilled operator. To assist in this editing process, some translation systems include built-in editing facilities. One approach used in these systems has been to make alternate translations for individual words available to the operator. Another approach has been to provide a series of preferred alternate sentence translations and to permit the operator to choose the preferred one.

The translation operation generally includes a structural conversion operation. The objective of structural conversion is to transform a given parse tree (i.e., a syntactic structure tree) of the source language sentence to the corresponding tree in the target language. Grammar-rule-based structural conversion and template-to-template structural conversion have been tried. In grammar-rule-based structural conversion, the domain of structural conversion is limited to the domain of grammar rules that have been used to obtain the source-language parse tree (i.e., to a set of nodes that are immediate daughters of a given node). For example, given VP = VT01 + NP   (a VerbPhrase consists of a SingleObject Transitive Verb and a NounPhrase, in that order)

and:

Japanese: 1 + 2 => 2 + 1 (Reverse the order of VT01 and NP)

each source-language parse tree that involves application of the rule is structurally converted in such a way that the order of the verb and the object is reversed (note that in Japanese, the verb appears to the right of its object). This method is very efficient in that it is easy to find out where the specified conversion applies—it applies exactly at the location where the rule has been used to obtain the source language parse tree. On the other hand, it can be a weak conversion mechanism in that its domain, as specified above, may be extremely limited, and in that natural language may require conversion rules that straddle over nodes that are not siblings.

In template-to-template structural conversion, structural conversion is specified in terms of I/O templates or subtrees. If a given input template matches a given structure tree, that portion of the structure tree that is matched by the template is changed as specified by the corresponding output template. This is a very powerful conversion mechanism, but it can be costly in that it can take time to find out if a given input template matches any portion of a given structure tree.

SUMMARY OF THE INVENTION

The present invention includes an automated natural language translation method and apparatus. These present the advantage of greater productivity for operators of the system, as they allow them to retain just the portion of the translation that they deem acceptable, while causing the remaining portion to be retranslated. Since this selective retranslation operation is precisely directed at portions that require retranslation, operators are saved the time and tedium of considering potentially large numbers of incorrect, but highly ranked translations. Furthermore, because the system of the invention allows for arbitrary granularity in translation adjustments, more of the final structure of the translation will usually have been generated by the system, rather than by manual operator edits. This reduces the potential for human error and saves time in edits that may involve structural, accord and tense changes. The system can therefore efficiently give operators the full benefit of its potentially extensive and reliable knowledge of grammar and spelling. The invention's versatile handling of ambiguous sentence boundaries in the source language, and its powerful semantic propagation provide further accuracy and reduced operator editing of translations. Stored statistical information also improves the accuracy of translations by tailoring the preferred translation to the specific user site. The system's idiom handling method is advantageous in that it allows sentences that happen to include the sequence of words making up the idiom, without intending the meaning of the idiom, to be correctly translated, and ranking of the idiom dictionary adds a further level of power and versatility to this operation. The system of the invention is efficient, while retaining versatile functions, such as long distance feature matching. The structural balance expert and the coordinate structure expert effectively distinguish between intended parses and unintended parses. The capitalization expert effectively obtains correct interpretations of capitalized words in sentences, and the capitalized sequence procedure effectively deals with multiple-word proper names, without completely ignoring common noun interpretations.

DESCRIPTION OF EXEMPLARY EMBODIMENT

Figure 1:
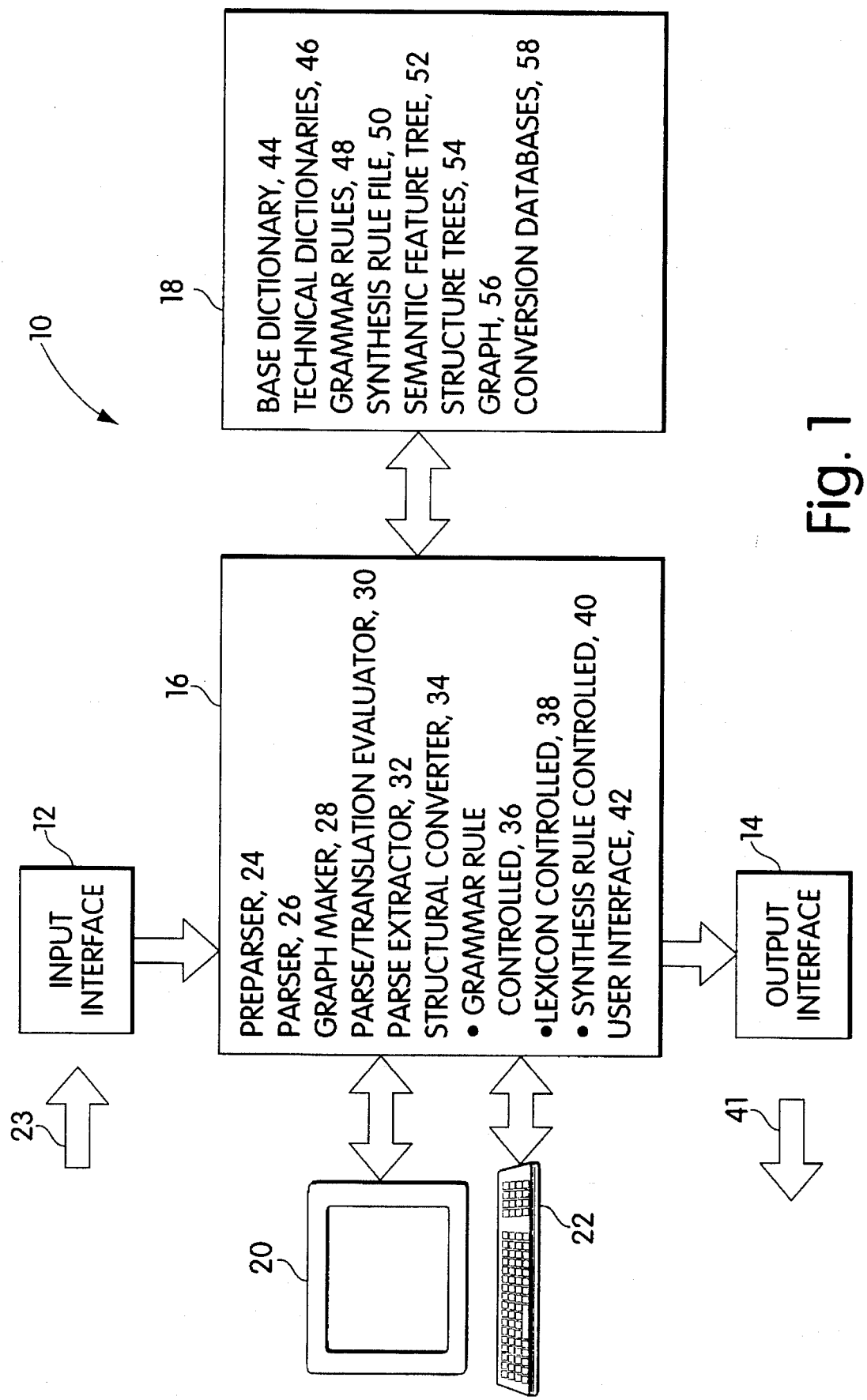
FIG. 1 is a block diagram illustrating apparatus for performing automated translation of natural language according to the invention.
Figure 2:
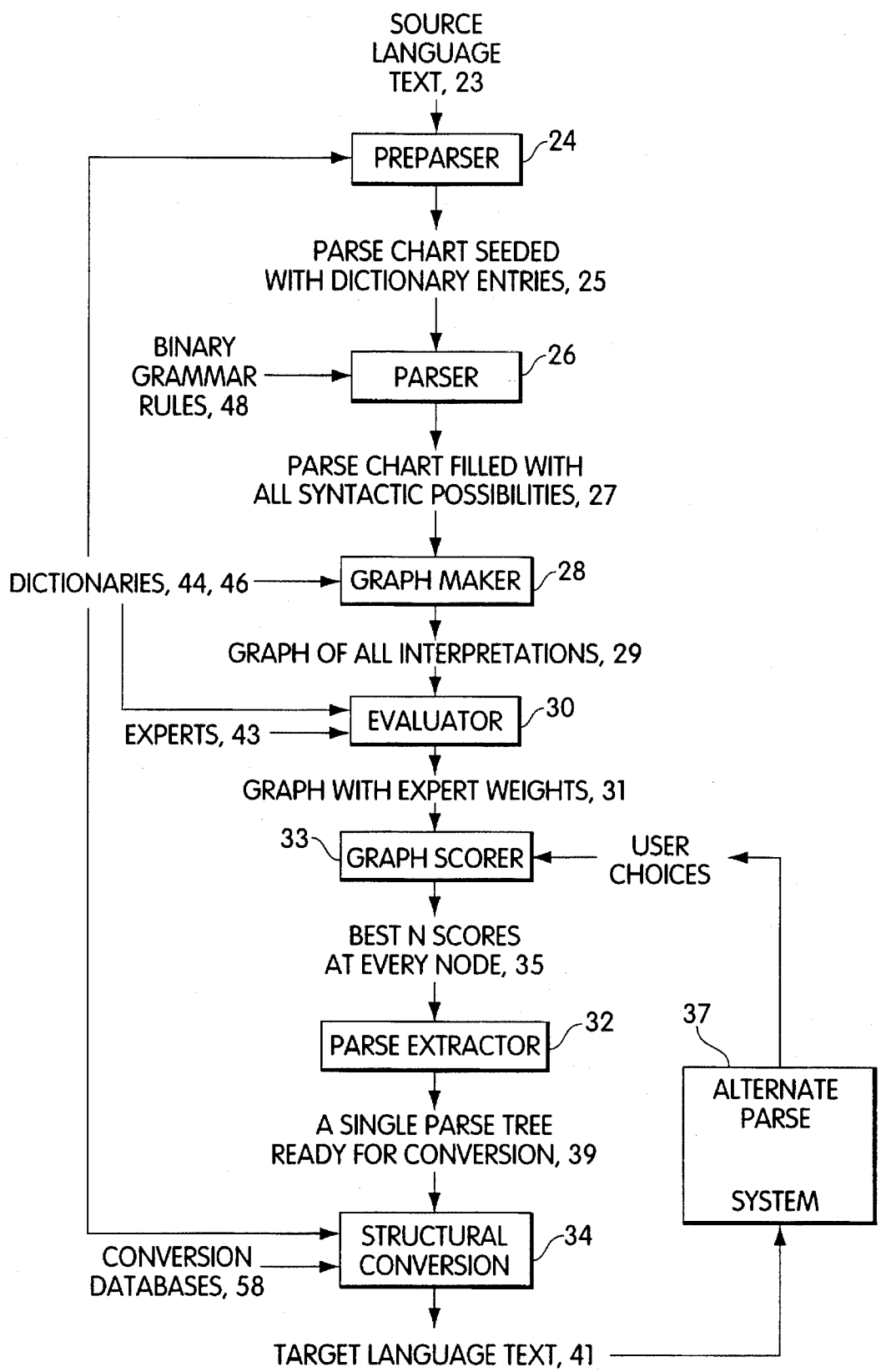
FIG. 2 is a data flow diagram illustrating overall functioning of the embodiment presented in FIG. 1.

Referring to FIGS. 1 and 2, an automated translation system 10 according to the invention includes an input interface 12, a translation engine 16, storage 18, a user input device 22, a display 20, and an output interface 14. The input interface is constructed to receive a sequence of text in a source language, such as English. The input interface may comprise a keyboard, a voice interface, or a digital electronic interface, such as a modem or a serial input. The translation engine performs translation operations on the source text, in conjunction with data in storage. The translation engine may be comprised entirely of hardwired logic circuitry, or it may contain one or more processing units and associated stored instructions. The engine may include the following elements, or parts of them: A preparser 24, a parser 26, a graph maker 28, a parse/translation evaluator 30, a parse extractor 32, a structural converter 34, and a user interface 42, which includes an alternate parse system 37. The structural converter may comprise a grammar rule controlled structural converter 36, a lexicon controlled structural converter 38, and a synthesis rule controlled structural converter 40. The storage 18 may include one or more areas of disk or memory storage, or the like. It may store the following elements, in whole or in part: a base dictionary 44, technical dictionaries 46, grammar rules 48, synthesis rules 50, a semantic feature tree 52, structure trees 54, and a graph 56. The user input interface 22 may comprise a keyboard, a mouse, touchscreen, light pen, or other user input device, and is to be used by the operator of the system. The display may be a computer display, printer or other type of display, or it may include other means of communicating information to the operator. The output interface 14 communicates a final translation of the source text in the target language, such as Japanese. The interface may comprise a printer, a display, a voice interface, an electronic interface, such as a modem or serial line, or it may include other means for communicating that text to the end user.

Figure 3:
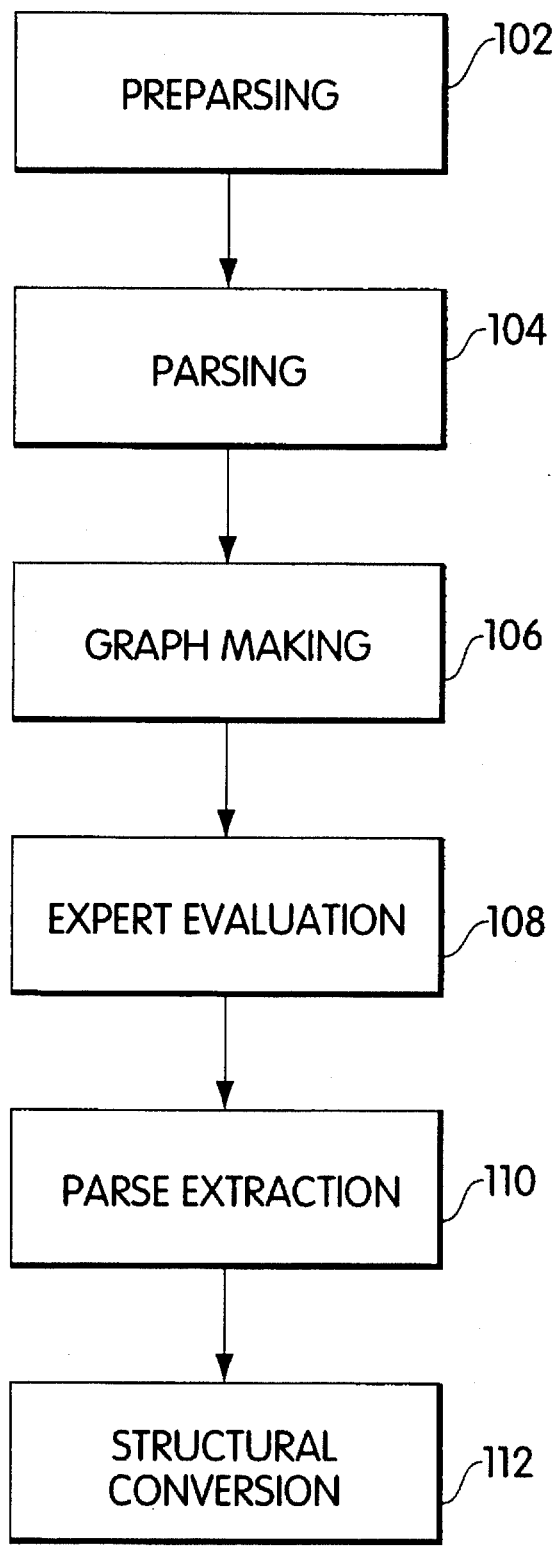
FIG. 3 is a flow diagram illustrating the operation of the automated natural language system of FIG. 1.

In operation of one embodiment of the translation system of the invention, referring to FIGS. 1, 2 and 3, the preparser 24 first performs a preparsing operation (step 102) on the source text 23. This operation includes the resolution of ambiguities in sentence boundaries in the source text, and results in a parse chart seeded with dictionary entries 25. The parser 26 then parses the chart produced by the preparser (step 104), to obtain a parse chart filled with syntactic possibilities 27. The graph maker 28 produces a graph of possible interpretations 29 (step 106), based on the parse chart resulting from the parsing step. The evaluator 30, which accesses a series of experts 43, evaluates the graph of stored interpretations (step 108), and adds expert weights to the graph 31. The graph scorer 33 scores nodes and associates the N (e.g., 20) best scores with each of them 35. The parse extracter 32 assigns a parse tree structure 39 to this preferred interpretation (step 110). The structural converter 34, which accesses the conversion tables 58, then performs a structural conversion operation (step 112) on the tree to obtain a translation 41 in the target language. The user may interact with the alternate parse system 37 to obtain alternative translations.

Figure 4:
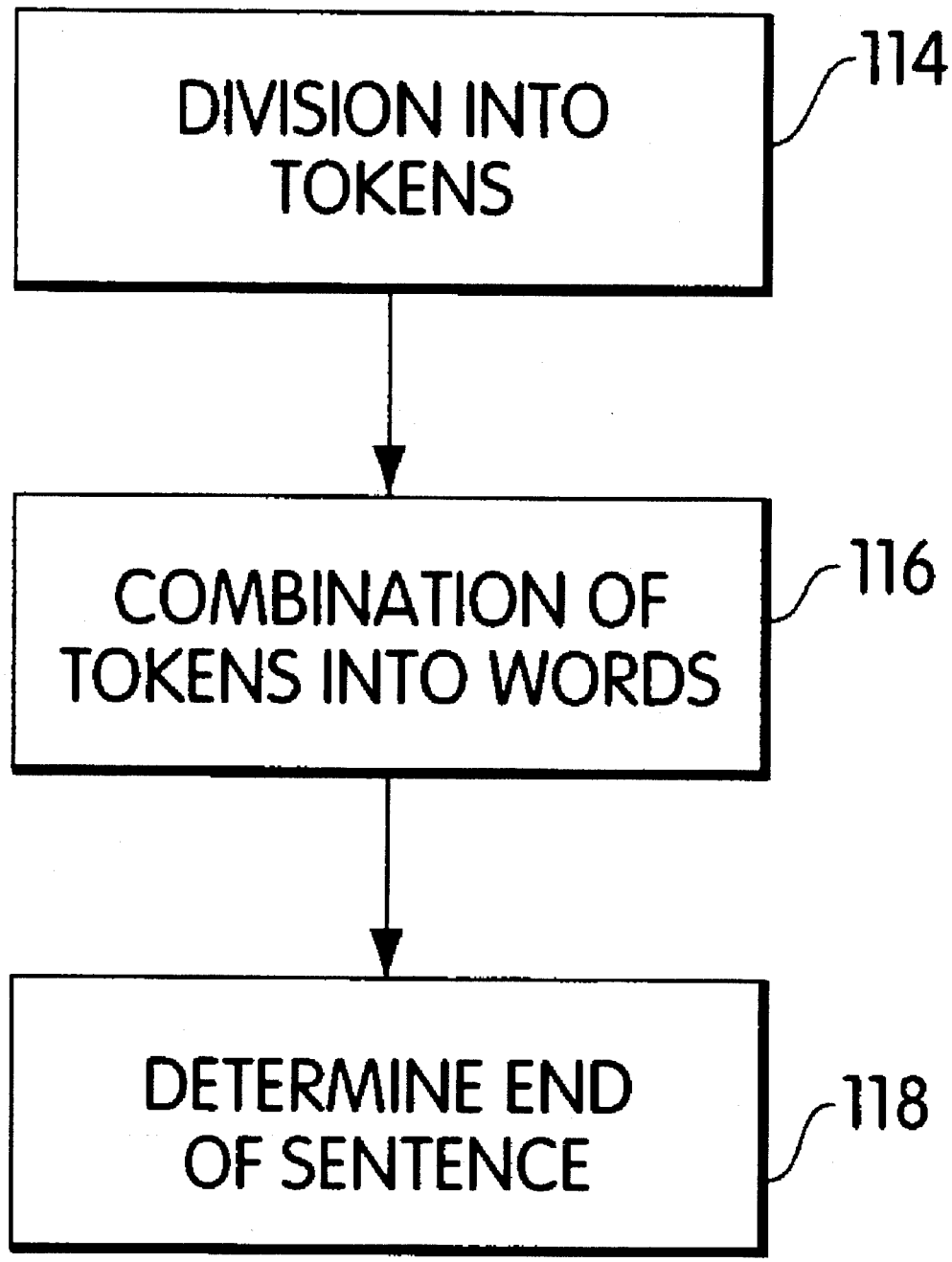
FIG. 4 is a flow diagram illustrating the operation of the end-of-sentence function of the preparser of the apparatus of FIG. 1.

Referring to FIG. 4, the system begins the preparsing operation by dividing the input stream into tokens (step 114), which include individual punctuation marks, and groups of letters that form words. A group of tokens form a substring which may comprise one or more words which occur in the order specified as part of a sentence. The occurrence of whitespace affects the interpretation of characters at this level. For instance, in "x - y" the "-" is a dash, but in "x-y" it is a hyphen.

The preparser then combines the tokens into words (step 116). At this level, it recognizes special constructions such as phone numbers and social security numbers as single units. The preparser also uses dictionary lookup to find groupings. For example, if "re-enact" is in the dictionary as "reenact" it will become one word in the sentence, but if it is not, then it will remain as three separate "words".

The next preparsing phase involves determining where the sentence ends (step 118). During this operation, the preparser accesses the base dictionary and the technical dictionaries as it follows a sequence of steps for each possible sentence ending point (i.e., after each word of the source text). The preparser need not perform these steps in the particular order presented, and these may be implemented as a series of ordered rules or they may be hardcoded.

Figure 5:
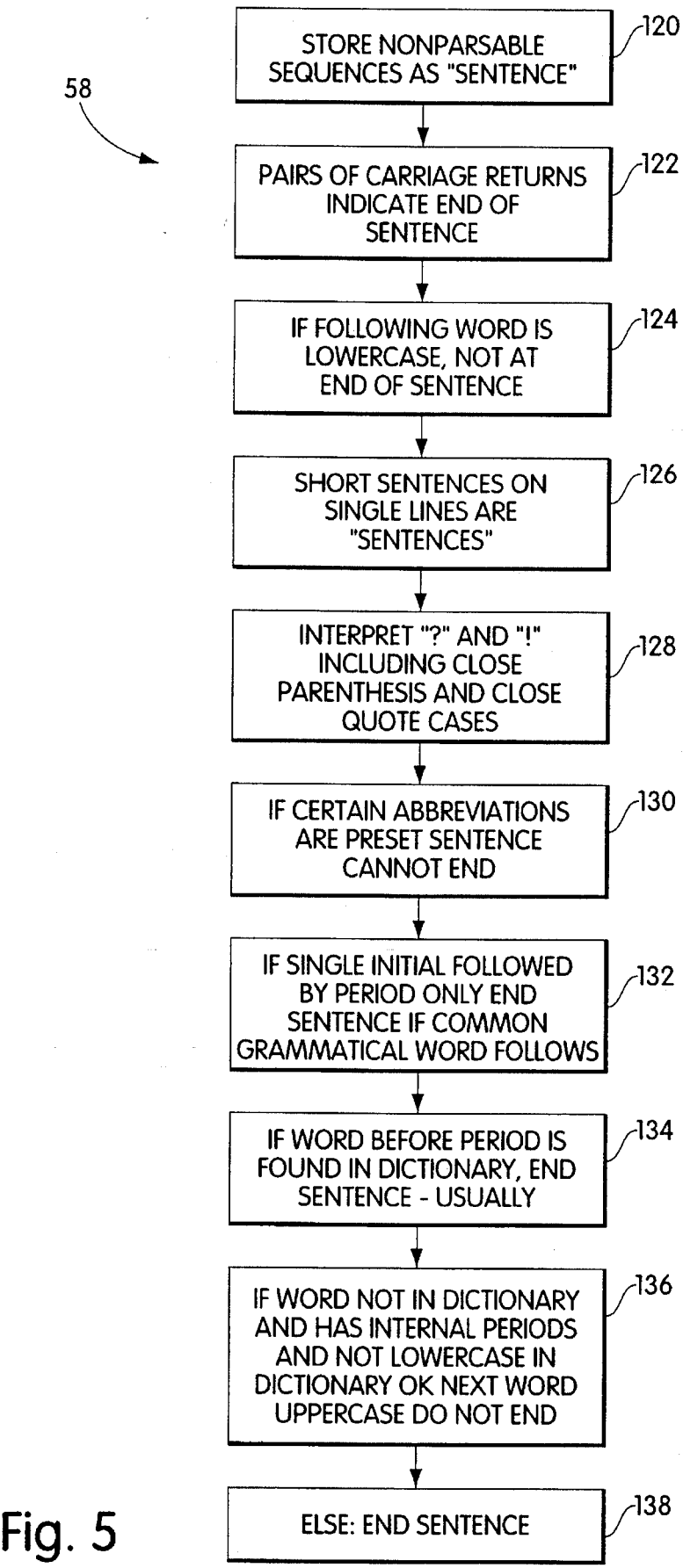
FIG. 5 is a flow diagram illustrating the operation of the parser of the apparatus of FIG. 1.

Referring to FIG. 5, the preparser interprets and records any nonparsable sequence of characters, such as a series of dashes: "------", as a sentence by itself, although not one which will be translated (step 120). The preparser also requires any sequence of two carriage returns in a row to be the end of a sentence (step 122). If the first letter of the next word is a lower case letter, the preparser will not indicate the end of a sentence (step 124). If a sentence started on a new line and is short, the preparser considers it a "sentence" of its own (e.g., a title).

The preparser interprets a period, a question mark, or an exclamation mark as the end of a sentence, except in certain situations involving end parenthesis and end quotes (step 128). In the case of sentences that ends with ." or ?" or the like, the preparser uses virtual punctuation marks after the quote in addition to the punctuation before the quote. Alternatives for the underlying punctuation required for ?" are illustrated in the following examples:

The question was "What do you want?".

Did he ask the question "What do you want?"?

Are you concerned about "the other people"?

In English, each of these is likely to end with ?" The virtual punctuation marks added by the preparser indicate that before the quote there is something which can be either a question mark or nothing at all. After the quote there is something that can be either a period or a question mark. The grammatical structure of the rest of the sentence allows later processing stages to select the best choice.

The preparser may also use several further approaches in preparsing a period (steps 130, 132, 134, 136, and 138). Some abbreviations in the dictionary are marked as never beginning sentences and others as never ending sentences (step 130). These rules are always respected. For example, "Ltd" never begins a sentence and "Mr" never ends one. The preparser also will not end a sentence with a single initial followed by a period unless the next word is a common grammatical word (step 132). If the word before the period is found in any dictionary, the period will end the sentence (step 134). If the word before the period is not in this dictionary, and it has internal periods, (as in I.B.M.) and the next word is not in the dictionary in a lowercase form, or the word after that is itself uppercase, then this is not an end of sentence (step 136). In remaining cases the period does mark the end of sentence (step 138).

Referring again to FIGS. 2 and 3, once the sentence boundaries have been defined by the preparser, the parser places the words of the sentence in syntactic categories, and applies grammar rules from the grammar database to them to compute possible syntactic interpretations 25 of the sentence (step 104). These grammar rules 48 can be implemented as a series of computer readable rules that express the grammatical constraints of the language. For the English language, there may be hundreds of such rules, which may apply to hundreds of syntactic categories. To reduce the computational overhead of this operation, the different possible meanings of a word are ignored.

In the next step (step 106), the graph maker employs the dictionary to expand the results of the parser to include the different meanings of words and creates a directed acyclic graph representing all semantic interpretations of the sentence. This graph is generated with the help of a series of semantic propagation procedures, which are described below. These procedures operate on a series of authored grammar rules and, in some cases, access a semantic feature tree for semantic information. The semantic feature tree is a tree structure that includes semantic categories. It is roughly organized from the abstract to the specific, and permits the procedures to determine how semantically related a pair of terms are, both in terms of their separation in the tree and their levels in the tree. For example, "cat" and "dog" are more related than "cat" and "pudding", and hence the former pair would be separated by a smaller distance within the tree. "Animal" and "cat" are examples of words that are stored at different levels in the tree, as "animal" is a more abstract term than "cat."

Figure 9:
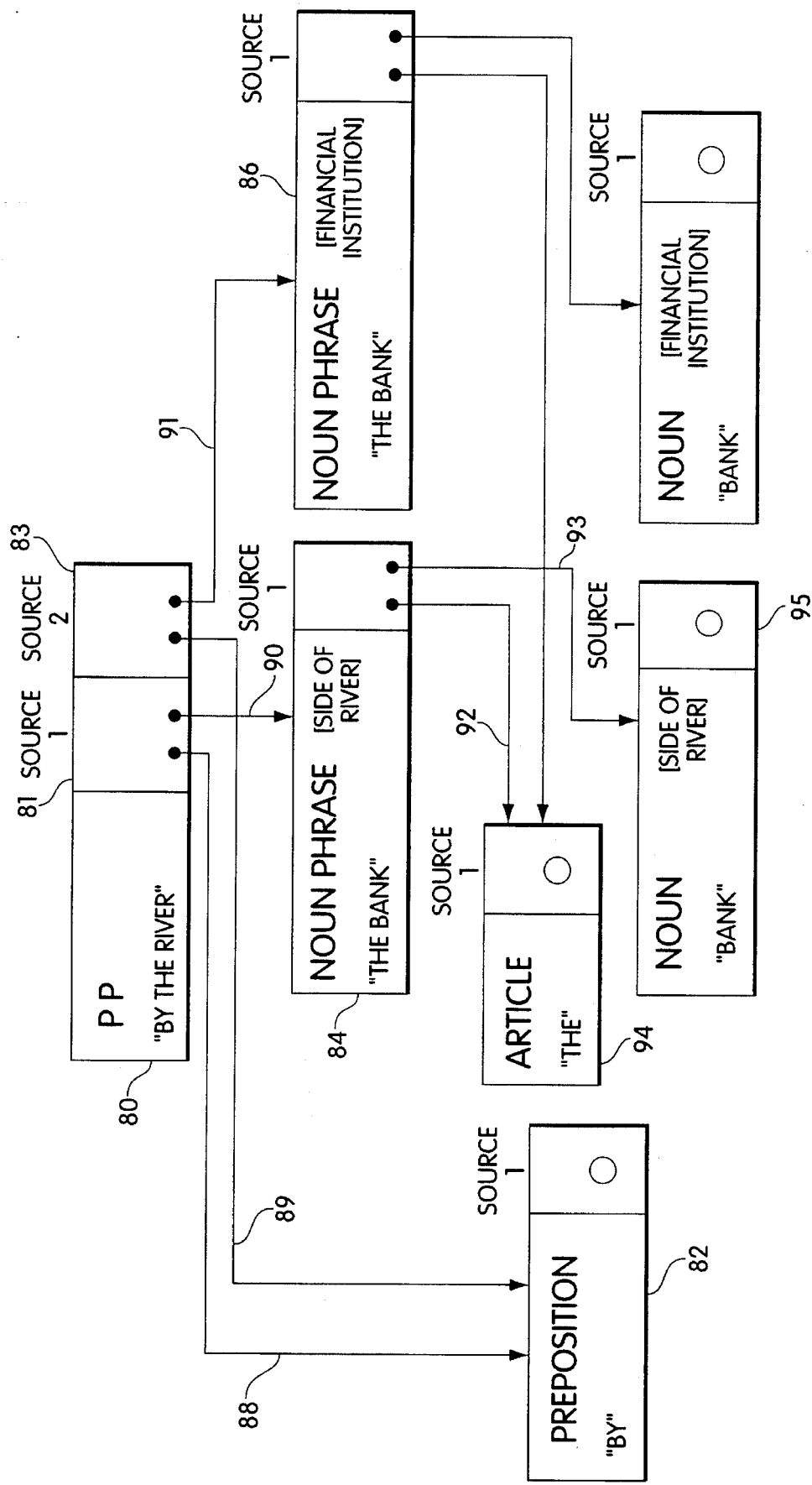
FIG. 9 is a diagram of a sample graph as used by the apparatus of claim 1, for the exemplary phrase "by the bank".

Referring to FIG. 9, the graph includes nodes 80 and their subnodes 82, 84, 86 linked by pointers 88, 89, 90, 91 in a manner that indicates various types of relationships. A first type of relationship in the graph is one where nodes representing phrases possess pointers to constituent word nodes or sub-phrase nodes. For example, a node 84 representing the phrase "the bank" will be linked by pointers 92, 93 to the constituent words "the" 94, and "bank" 95. A second type of relationship in the graph is where phrase interpretations possess pointers to alternate ways of making the same higher-level constituent from lower-level pieces. For example, a node 80 representing the phrase "by the bank" can have two source interpretation locations 81, 83, which each include pointers 88 & 89, 90 & 91 to their respective constituents. In this example, the different constituents would include different subnodes 84, 86 that each represent different meanings for the phrase "the bank". The structure of the graph is defined by the results of the parsing operation and is constrained by the syntax of the source sentence. The nodes of the graph are associated with storage locations for semantic information, which can be filled in during the process of semantic propagation.

The semantic propagation part of the system operates to propagate semantic information from smaller constituents to the larger constituents they comprise. It applies to four classes of the syntactic categories used in the earlier parsing operation: SEMNP (which includes noun-like objects and prepositional phrases), SEMVP (verb phrase like objects, which usually take subjects), SEMADJ (adjectives) and VERB (lexical verb-like verbs that often take objects). Other syntactic categories are ignored within a rule. The grammar rule author may also override the implicit behavior below by specific markings on rules. These specific instructions are followed first.

There are two aspects to the manner in which semantic features are propagated through the system. The first is a set of rules that tell from examining the noun-like and verb-like constituents in a grammar rule, which selectional restriction slots of the verb-like constituents apply to which noun-like objects. For instance, the rule for the verb phrase of the sentence: "I persuaded him to go" is roughly VP=VT11+NP+VP (where VP is a verb phrase, VT11 is a type of transitive verb, and NP is a noun phrase). One exemplary default rule indicates that when a verb takes objects, selectional restrictions are to be applied to the first NP encountered to the right of the verb. Another rule says that VP restrictions on their subjects should be applied to the first NP found to the left of a VP. Together these rules make sure that "persuade him" and "him go" are both evaluated for their semantic plausibility. As mentioned before, these rules reflect the complex grammar of the English language and there may therefore be quite a few of them.

Figure 6:
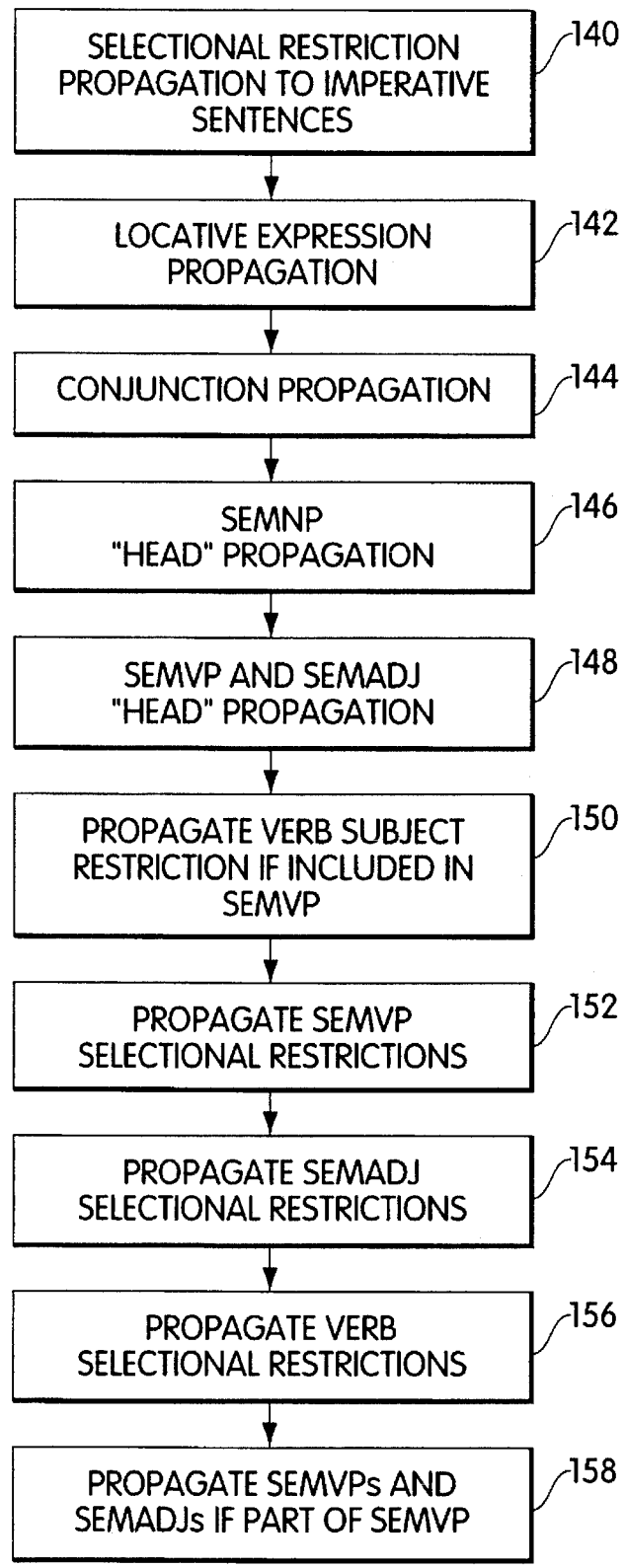
FIG. 6 is a flow diagram illustrating the semantic propagation operations of the apparatus of FIG. 1.

Referring to FIG. 6, the semantic propagation operation includes copying of selectional restrictions from SEMVPs to imperative sentences (step 140). If a SEMNP is being used as a locative expression, its goodness is evaluated against semantic constants defining good locations (step 142). If a rule involves a conjunction of two SEMNPs (detected because of ANDing together of syntactic features), the graph maker ANDs together the semantic features and applies the semantic distance expert (step 144).

If, in the course of examining the rules specified for syntactic feature propagation, the graph maker locates a "head" SEMNP which gets propagated to a higher level (e.g., it becomes part of a SEMNP that includes more words), it propagates semantic features as well (step 146). However, if the "head" is a partitive word (e.g., "portion," "part"), it propagates from a SEMNP to the left or right instead. SEMVPs and SEMADJs are propagated in the same way, with the only exception being that SEMVPs and SEMADJs do not have any partitive situations (step 148). Adjectives are part of the SEMVP class for this purpose.

When a SEMVP is made from a rule including VERBs, the graph maker propagates upward the VERB's subject restriction unless the VP is a passive construction, in which case the VERB's first object restriction is propagated instead (step 150). In any rule containing SEMVPs, it attempts to apply the selectional restrictions of the SEMVPs to NPs encountered moving leftward from the SEMVP (step 152). In any rule containing SEMADJs, the graph maker attempts to apply the selectional restriction of the SEMADJ first to any SEMNPs encountered moving to the right from the SEMADJ, and if that fails, tries moving to the left (step 154).

For any remaining unused object selectional restrictions of a VERB (that have not been propagated upward because of passives), the graph maker applies them in turn to SEMNPs encountered in order to the right of the VERB (step 156). In all of these rules, a verb selectional restriction is used up as soon as it applies to something. In all rules up to this one, SEMNPs Are not used up when something applies to them. Starting at this rule, the SEMNP does get "used up". Finally, if a rule makes a SEMVP, the graph maker determines if there are any SEMVPs or SEMADJs in it that have not yet been used, and if so, propagates them upward (step 158).

The system also performs feature matching of linguistic features. Linguistic features are properties of words and other constituents. Syntactic feature matching is used by the parser, and semantic feature matching is used by the graph maker. But the same techniques are used for both. For instance, "they" has the syntactic feature plural, while "he" has the feature of singular. Feature matching uses marking on grammar rules so that they only apply if the features of the words they are to apply to meet certain conditions. For example, one rule might be:

$$S=NP[@]+VP[@]$$

Where the @ signs mean that the number features of the NP and VP must match. So while this rule will allow "they are" and "he is", it will not allow "they is" and "he are".

Feature match restrictions are broken into "local" and "long distance". The long distance actions may be computed when the grammar is compiled, rather than when actually processing a sentence. The sequence of long distance operations that must be performed is then encoded in a series of instruction bytes. The computation of long distance feature operations must start with an n-ary rule (i.e., one that may have more than two inputs on its right). The system then distributes codes to various binary rules so that feature sets end up being propagated between rules in the correct fashion. By breaking the n-ary rules into binary rules, the parsing operations are greatly simplified, but because the system keeps track of feature sets across binary rules, it retains the power of the long distance operations.

The system of the invention also allows multiword "idioms" as part of the dictionary, while retaining representations of the individual words of which they are composed. These two forms may ultimately compete against each other to be the best representation. For instance "black sheep" is found in the dictionary with the meaning of a disfavored person. But in some cases the words "black sheep" may refer to a sheep which is black. Because both of the forms are retained, this non-idiomatic usage may still be chosen as the correct translation.

The idioms may belong to further categorizations. For example, the system may use the following three types:

Almighty: United States of America

Preferential: long ago

Normal: black sheep

Almighty idioms suppress any other possible interpretation of any of the words that make up the sequence. Preferential idioms suppress other constituents of the same general type and that use the very same words. Normal idioms compete on an even footing with other entries.

The resulting graph is to be evaluated by experts (step 108, FIG. 3), which provide scores that express the likelihood of correctness of interpretations in the graph. The system of the invention includes a scoring method that applies to all partial sentences of any length, not just full sentences. An important element in the use of a graph is that a subtree is fully scored and analyzed only once, even though it may appear in a great many sentences. For example, in the phrase "Near the bank there is a bank.", the phrase "Near the bank" has at least two meanings, but the best interpretation of that phrase is determined only once. The phrase "there is a bank" similarly has two interpretations, but the best of those two is determined only once. There are therefore four sentence interpretations, but the subphrases are scored just once. Another feature of the graph is that each node is labeled with easily accessible information about the length of that piece of the sentence. This allows the best N interpretations of any substring of the English sentence to be found without reanalyzing the sentence.

Although, in one implementation, only the N overall best analyses of the sentence are available at any one time (N being a number on the order of 20), the use of a graph allows the system to integrate the result of a user choice about a smaller constituent and give a different N best analyses that respect the user's choice. Because all this is done without reparsing the sentence or rescoring any substrings, it may be done quickly.

Figure 8:
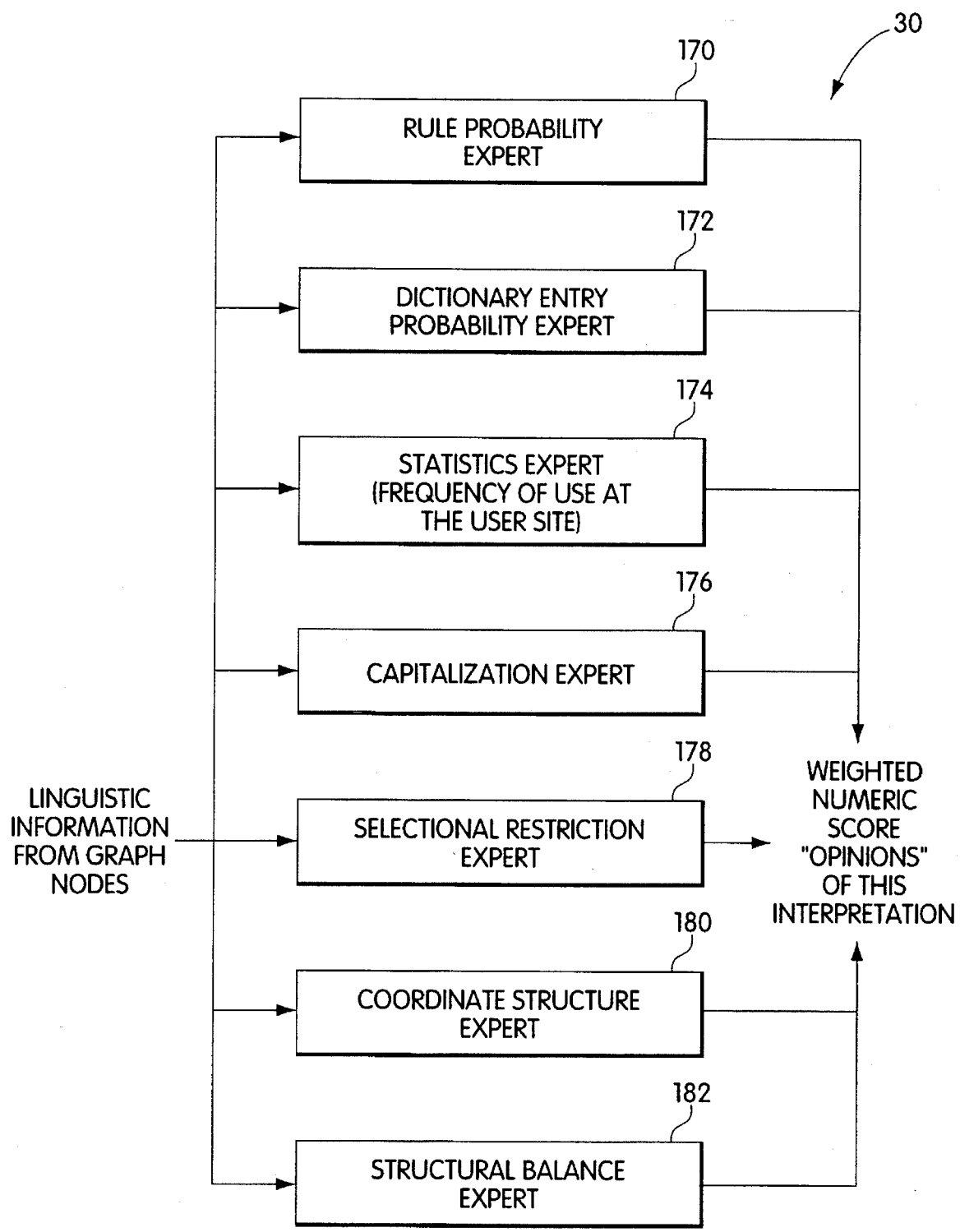
FIG. 8 is a flow diagram illustrating the expert evaluator of the apparatus of FIG. 1.

Referring to FIG. 8, operation of the expert evaluator 30 is based on various factors that characterize each translation, which are handled by the various experts. The rule probability expert 170 evaluates the average relative frequency of grammar rules used to obtain the initial source language parse tree. The selectional restriction expert 178 evaluates the degree of semantic accord of the given translation. The dictionary entry probability expert 172 evaluates the average relative frequency of particular parts of speech of the words in the sentence used to obtain the initial source language parse tree. The statistics expert evaluates the average relative frequency of particular paraphrases chosen for the given translation.

The system keeps track of statistical information from translation usage at each customer site at more than one level. For example, the system may maintain statistical counts at the surface form level (how often was "leaving" used as a transitive versus an intransitive verb), and also at the meaning level (did it mean "leave behind" or "depart" from), and this second type is summed over occurrences of "leave", "leaves", "left", and "leaving". The system may also keep statistical counts separately for uses that have occurred within the last several sentences, and uses that have occurred at any time at the customer site. Furthermore, the system may distinguish cases where the user intervened to indicate that a particular word sense should be used, from cases where the system used a particular word sense without any confirmation from the user.

The structural balance expert 182 is based on a characteristic of English and many other European languages pertaining to the lengths of constituents in a given sentence. In some (but not all) constructions, sentences which involve heavy (lengthy) elements to the left of light elements are disliked in these languages. For example:

---

Mary hit Bill with a broom.
    Light Heavy
[acceptable]
Mary hit with a broom Bill.
    Heavy        Light
[unacceptable]
Mary hit with a broom a dog that tried to bite her.
    Heavy        Heavier
[acceptable]

---

Given two parses of a given sentence, if one contains a "Heavy - Light" sequence involving a construction that tends to avoid such a sequence, and if the other parse does not, then it can be assumed that the former does not represent the intended interpretation of the sentence. This expert is an effective way to distinguish between intended parses and unintended parses.

In coordinate structures of the pattern of "A of B and C" it can be difficult to determine whether the intended interpretation is "A of [B and C]" or "A [of B] and C". The coordinate structure expert 180 measures the semantic distance between B and C, and that between A and C to determine which mode of coordination combines two elements that are closer in meaning. This expert accesses the semantic feature tree during its operation. This expert is also an efficient way to distinguish between the intended parses and the unintended parses of a given sentence.

Many words in English include potential ambiguities between ordinary-noun and proper-name interpretations. The capitalization expert 176 uses the location of capitalization in a sentence to determine how likely it is that the capitalization is significant. For example, the following sentences:

Brown is my first choice.

My first choice is Brown.

are different in that while the former is genuinely ambiguous, it is far more likely in the latter that "Brown" is a person name than a color name. This expert takes into consideration factors such as whether a given capitalized word appears at sentence-initial or sentence-noninitial position (as shown above), whether the capitalized spelling is in the dictionary, and whether the lower-case-initial version is in the dictionary. This expert is an effective way to obtain the correct interpretations of capitalized words in sentences.

If a sentence contains a sequence of initial-uppercase words, it can be treated as a proper name or as a sequence of ordinary nouns. The system of the invention employs a capitalized sequence procedure, which favors the former interpretation. Also, if the sequence cannot itself be parsed by normal grammar rules, it can be treated as a single unanalyzed noun phrase to be passed through untranslated. This procedure has proven to be a very effective way of dealing with multiple-word proper names while not completely ignoring the lower-rated common noun interpretations.

Figure 7:
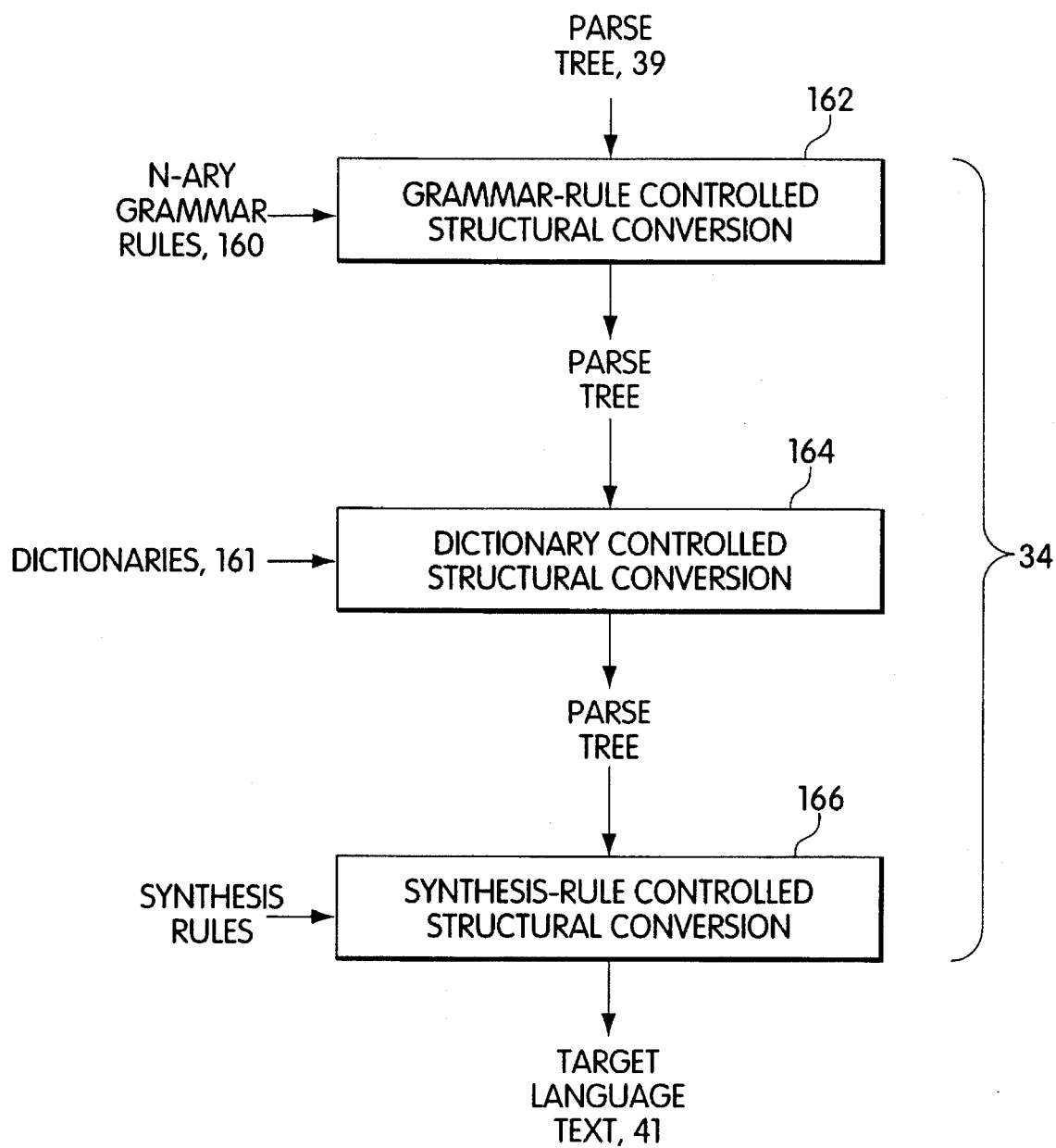
FIG. 7 is a flow diagram illustrating the structural conversion operations of the apparatus of FIG. 1.

Referring to FIG. 7, the machine translation system of the invention uses a grammar-rule controlled structural conversion mechanism 162 that has the efficiency of a straightforward grammar-rule-based structural conversion method, but which comes close to the power of the template-to-template structural conversion method. This method relies on the use of grammar rules 160 which can specify non-flat complex substructure. While the following is a rule format used in other translation systems:

$$Y => X1 + X2 + \ldots Xn$$
Substructure Specified
$$Y$$
$$X1 \; X2 \ldots Xn$$

the system of the invention uses grammar rules of the following format:

$$Y => \#Z1(i) \; \#Z2(2) \; X1 +$$

$$X2 \ldots + Xi + X(i+1) + X(i+2) + \ldots$$

Substructure Specified

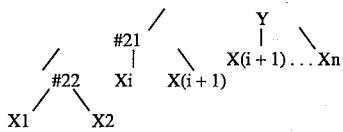

In this syntax, symbols prefixed with "#" are virtual symbols that are invisible for the purpose of sentence structure parsing, but which are used in building substructures once a given parse is obtained.

Given this type of grammar, it becomes possible to specify multiple structure conversion among any sequences of nodes that are siblings in the substructure. This transforms a grammar-rule-based structure conversion mechanism into one with some of the power of the templete-to-template structure conversion mechanism. Although the system of the invention is based on the second type of grammar rules presented above, it automatically compiles the corresponding grammar rules of the first form. It can therefore use grammar rules of the first form to parse sentences, and use grammar rules of the second form to build parse structures.

The structural conversion also includes a dictionary controlled structural conversion operation 166, which accesses dictionaries 161 to operate on the parse tree after it has been operated upon by the grammar-rule controlled structural conversion operation. The synthesis-rule controlled structural conversion operation then applies synthesis rules to the resulting parse tree to provide the target language text 41.

Referring again to FIGS. 1 and 2, after the system has derived a best-ranked translation in the process described above, it is presented to the user via the display 20. The user then has the option of approving or editing the translation by interacting with the alternate parse system 37, via the user input device 22. In the editing operation, the user may constrain portions of the translated sentence that are correctly translated, while requesting retranslation of the remaining portions of the sentence. This operation may be performed rapidly, since the system retains the graph with expert weights 31.

The above operations may be implemented by a variety of hardwired logic design and/or programming techniques. The steps as presented in the flowcharts generally need not be applied in the order presented, and combinations of the steps may be combined. Similarly, the functionality of the system may be distributed into programs and data in various ways. Furthermore, it may be advantageous to develop the grammar and other operative rules in one or more high level languages, while supplying them to end users in a compiled format.

The invention may be embodied in other specific forms without departing from the spirit and the essential characteristics thereof. Accordingly, the invention is to be defined not by the preceding description, which is intended as illustrative, but by the claims that follow.

What is claimed is:

1. Apparatus for translating textual information expressed in a source natural language into textual information expressed in a target natural language, comprising:

a textual input interface for receiving and storing the textual information in the source natural language;

a translation engine, comprising:
  a preparser for resolving ambiguities and determining the end of a sentence, comprising:
    means for dividing the input text into words, and
    means for associating the words with one or more dictionary entries and a sequence of words with one or more multiword dictionary entries, the means for associating including one or more dictionaries;
  a parser comprising a grammar rules data base for computing possible syntactic interpretations of a sentence by application of grammar rules to applicable sentence constituents, the syntactic possibilities being stored in a chart;
  a graph making engine for expanding the chart into a graph which includes semantic interpretations of the sentence, the graph comprising:
    one or more nodes, wherein one node is assigned to each different combined syntactic and semantic interpretation for a particular substring of the sentence, each node's information being generated from a subnode(s) from which the node was formed and the grammar rule which was used to form the node; and
    one or more pointers connecting a higher level node to its subnode, wherein a node without a subnode corresponds to a dictionary entry;
  a storage means accessible to the graph making engine for storing each node and its semantic and syntactic information;
  means for propagating the semantic information associated with each node upward through the graph;
  an expert evaluator comprising a plurality of experts for evaluating the graph of stored semantic, syntactic, and other information for each node, wherein each expert assigns a numerical weight (N) to the node;
  a scoring module for evaluating and combining the numerical weight (N) assigned each node by the experts, the scoring module storing the best combined numerical weight (N) scores for each node and also using the list of scores from the subnodes of the node to compute the node's score list;

a parse extractor for creating a parse tree structure from any best numerical weight (N) represented on the list of such weights for each node;

a structural converter having conversion tables for the target language for performing a structural conversion on the parse tree structure generated by the parse extractor to obtain a translation of the source language text to the target language, wherein the structural converter further includes components which control structural conversion based on access to one or more dictionaries or other data files;

a display for displaying the translation to the user;

a user interface permitting the user to interact with the translation engine to obtain alternative translations once the apparatus has provided the user with the best translation of the source language, the user interface allowing the user to request alternative translations for a word, the entire sentence, or any sequence of words in the sentence, and allowing the user to view retranslation of the entire sentence which includes the alternatives for the portion of the sentence that the user selected; and an editing interface module coupled to the display and responsive to the user input device and the storage means, including a graph access module responsive to input from the user input device to alter a decision by the scoring module and to display an alternate translation on the display.

2. The apparatus of claim 1 wherein said graph maker is constructed to maintain alternate meanings of words and alternate relations between words in the graph.

3. The apparatus of claim 1 wherein the editing interface further includes a constraints facility responsive to user input from the user interface to select portions of the current preferred translation of a variety of different lengths not restricted to single dictionary entries or entire sentences to be retranslated while constraining remaining portions of the current preferred translation.

4. The apparatus of claim 3 wherein the constraints facility is constructed to allow repeated differing constrained translation operations.

5. The translation engine as defined in claim 1 wherein the expert evaluator comprises:

a module for evaluating the average relative frequency of particular parts of speech of words in the textual input;

a module for evaluating the average relative frequency of particular paraphrases or meanings of words in the textual input;

a module for evaluating the average relative frequency of the use of grammar rules;

a module for evaluating the inter-relations of phrases and clauses within the sentence based on the length and grammatical role of the clauses and phrases;

a module for measuring the semantic distance between words, for use in evaluating conjunctions;

a module for evaluating words with regard to semantic relations between them, such as selectional restrictions; and a module for using capitalization of a word to influence which meaning of the word is used.

* * * * *